F. L. O. WADSWORTH.
ARTICLE OF PRISM GLASS.
APPLICATION FILED JAN. 23, 1907.
982,772.
Patented Jan. 24, 1911.
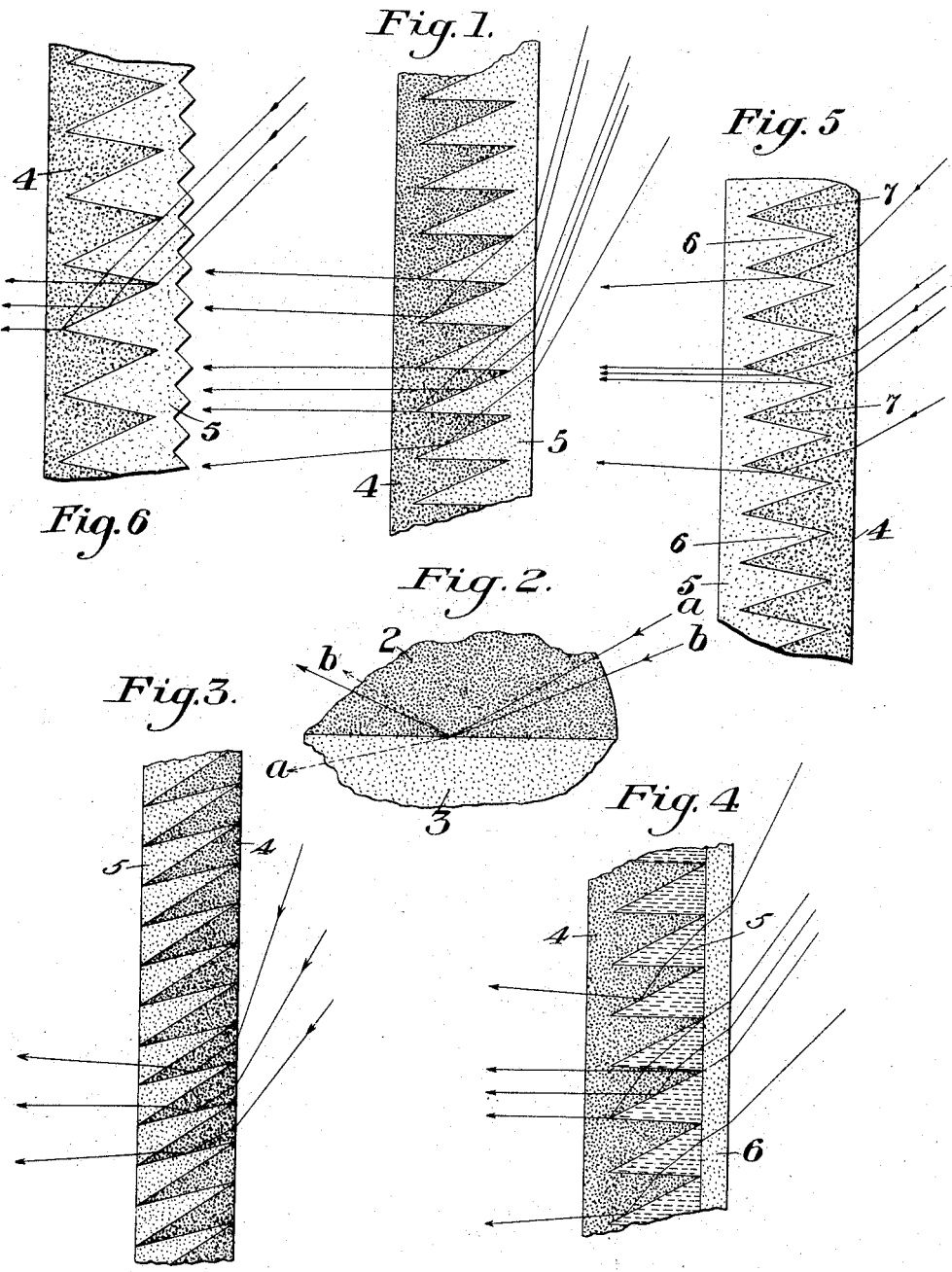

UNITED STATES PATENT OFFICE.

FRANK L. O. WADSWORTH, OF PITTSBURG, PENNSYLVANIA, ASSIGNOR TO PRESSED PRISM PLATE GLASS COMPANY, OF MORGANTOWN, WEST VIRGINIA, A CORPORATION OF WEST VIRGINIA.

ARTICLE OF PRISM-GLASS.

982,772.

Specification of Letters Patent.

Patented Jan. 24, 1911.

Original application filed December 12, 1905, Serial No. 291,397. Divided and this application filed January 23, 1907. Serial No. 353,624.

*To all whom it may concern:*

Be it known that I, FRANK L. O. WADSWORTH, of Pittsburg, in the county of Allegheny and State of Pennsylvania, have invented a new and useful Article of Prism-Glass, of which the following is a specification, reference being had to the accompanying drawings, forming part of this specification, in which—

Figure 1 is a vertical section of a piece of prism glass embodying my invention; Fig. 2 illustrates in diagram the mode of operation of the glass; and Figs. 3, 4, 5 and 6 are respectively sectional views showing modifications.

My invention provides a compound prism sheet of glass, in which the angular prism surfaces are not exposed on the exterior of the sheet.

The advantages derived from the invention are very great. As the angular prism surface is not exposed, the glass can easily be cleaned, and it presents a much more sightly appearance than the prism-glass sheets heretofore known.

The present application is a division of application Serial No. 291,397, filed December 12, 1905, and which issued as Patent No. 865,136, dated September 3, 1907.

The invention is based upon the principle, illustrated in Fig. 2, that if two bodies of glass of unequal density be fused together in intimate surface contact the light rays will be refracted in passing from one body to the other, or reflected by the surface of one of the bodies at the plane of union according to the angle at which the rays impinge thereon. This is illustrated in Fig. 2, in which 2 and 3 represent bodies of glass of unequal densities and of different refractive indices welded or fused together. Rays of light $a$ after passing through the body 2 are refracted in passing through the body 3, and rays $b$ striking the plane of meeting of the two bodies at a less angle are reflected therefrom.

In the manufacture of prism glass in accordance with my invention, I form a sheet of glass with a prismatic surface impressed thereon, employing preferably for that purpose the combined method of rolling and pressing described in Patent No. 661,025, granted to me conjointly with Daniel C. Ripley, and while the sheet so made is hot I roll upon it into a sheet a second body of glass of different refractive index which will fill up the cavities between the prismatic projections and will intimately unite therewith. Thus, referring to Fig. 1, I first roll a mass of glass into a sheet 4, and while the glass is still plastic I bring down upon its surface a die having a prism pattern and impress the prism pattern upon the glass. Then, withdrawing the die, I cast upon the prism surface of the sheet a second body of glass of different density, and by means of a roller I spread it over the surface, filling the ridges between the prisms and forming it into a second sheet 5. The compound sheet may then be ground and polished. The manner in which the light rays are refracted and reflected by such sheet is illustrated in the lines in Fig. 1. For the denser body of glass, or body having the higher refractive index I may use a barium-lead-soda glass, and for the less dense body, or body having the lower refractive index a potash-lime glass. The proper composition of batch for such glass will be understood by those skilled in the art.

In Fig. 3 I show a compound sheet which has been made in the manner explained above, and ground on each side to the plane of the apexes of the prisms.

In Fig. 4 I show a compound sheet of prism glass consisting, as before, of two sheets 4 and 5 of different refractive indices with their prism surfaces in intimate optical contact, but in which the sheet of lower refractive index is composed of other material than glass, such as Canada balsam, glycerin, etc. In this case a second flat sheet of glass 6 may be added to protect the outer surface of the sheet of lower refractive index. This outer sheet of glass, however, has no effect on the action of the compound prism sheet.

In Fig. 5 I show a compound sheet made as described with reference to Fig. 1, but with prisms 6 and 7 of different form, and with the sheet of glass of higher refractive index on the light-receiving side. The sheet of Fig. 1 has the sheet of lower refractive index on the light-receiving side.

The sheet shown in Fig. 6 has the second-formed sheet 5 spread with a grooved roller which imparts a grooved or figured surface to the sheet.

By the terms "optical contact" and contact as used herein and in the claims, a contact is meant which is of a nature so close as to exclude any intervening medium of a different density from that of the glass sheets. The presence of any intervening substance, such as air, water or cement, would prevent optical contact, as that term is herein used.

Many other modifications may be made by those skilled in the art, since

I claim:—

1. As a new article of manufacture, a compound prism sheet composed of sheets of transparent material of different refractive indices formed with prism surfaces in contact throughout and welded together; substantially as described.

2. As a new article of manufacture, a compound prism sheet composed of sheets of glass of different refractive indices formed with prism surfaces in contact throughout and welded together; substantially as described.

3. A continuous transparent prism plate, composed of two series of prismatic elements of different refractive indices, the surfaces of the prism elements of each series being in contact throughout and arranged in non-parallel relation with the outer faces of the assembled structure so that the sets of prism elements produce a cumulative deflection in the same direction of the transmitted rays of light; substantially as described.

4. A continuous transparent prism plate, composed of two series of prismatic elements of different refractive indices, and arranged in non-parallel relation with the outer faces of the assembled structure so that the sets of prism elements produce a cumulative deflection in the same direction of the transmitted rays of light, the prismatic elements of one series being in contact throughout with the prismatic elements of the other series; substantially as described.

5. A continuous transparent prism plate, composed of two series of prismatic elements of different refractive indices, arranged in non-parallel relation with the outer faces of the assembled structure so that the sets of prism elements produce a cumulative deflection in the same direction of the transmitted rays of light, the prismatic elements of one series filling the cavities between the other series and in contact throughout therewith; substantially as described.

6. A continuous transparent prism structure, composed of two series of prismatic elements of different refractive densities interfitted and in contact throughout with each other, the surfaces of the prism elements of each series being arranged in non-parallel relation with the other faces of the assembled structure, and the two series of prism elements producing a cumulative deflection in the same direction of the transmitted rays of light; substantially as described.

In testimony whereof, I have hereunto set my hand.

F. L. O. WADSWORTH.

Witnesses:
 Geo. B. Bleming,
 John Miller.